(12) United States Patent
Mountz et al.

(10) Patent No.: US 10,294,816 B2
(45) Date of Patent: May 21, 2019

(54) HIGH DURABILITY TURBINE EXHAUST CASE

(71) Applicants: United Technologies Corporation, Hartford, CT (US); GKN Aerospace Sweden AB, Trollhattan (SE)

(72) Inventors: Daryl B. Mountz, Woodstock, CT (US); Theodore W. Kapustka, Glastonbury, CT (US); Glenn Levasseur, Colchester, CT (US); Marcus Borg, Trollhattan (SE); Joakim Berglund, Trollhattan (SE); Anders Svahn, Vanersborg (SE); Johan Ockborn, Trollhattan (SE); Bengt Pettersson, Trollhattan (SE)

(73) Assignees: United Technologies Corporation, Farmington, CT (US); GKN Aerospace Sweden AB, Trollhattan (SE)

( * ) Notice: Subject to any disclaimer, the term of this patent is extended or adjusted under 35 U.S.C. 154(b) by 782 days.

(21) Appl. No.: 14/540,253

(22) Filed: Nov. 13, 2014

(65) Prior Publication Data

US 2015/0107223 A1    Apr. 23, 2015

Related U.S. Application Data

(63) Continuation of application No. 14/400,648, filed as application No. PCT/US2013/045765 on Jun. 14, 2013, now Pat. No. 10,036,276.

(Continued)

(51) Int. Cl.
*F01D 25/16* (2006.01)
*F01D 25/00* (2006.01)

(Continued)

(52) U.S. Cl.
CPC ......... *F01D 25/005* (2013.01); *F01D 21/045* (2013.01); *F01D 25/162* (2013.01);
(Continued)

(58) Field of Classification Search
CPC .......... F05D 2230/60; F02C 7/20; F02K 3/06; Y02T 50/671; F01D 25/005; F01D 25/28;
(Continued)

(56) References Cited

U.S. PATENT DOCUMENTS

| 4,478,551 A | 10/1984 | Honeycutt, Jr. et al. |
| 4,900,220 A | 2/1990 | Guimer et al. |

(Continued)

FOREIGN PATENT DOCUMENTS

| GB | 1137940 A | * 12/1968 | ........... F01D 25/162 |
| WO | 2010079472 A1 | 7/2010 | |
| WO | 2013095211 A1 | 6/2013 | |

OTHER PUBLICATIONS

International Preliminary Report on Patentability for International Application No. PCT/US2013/045765 dated Dec. 24, 2014.

(Continued)

*Primary Examiner* — Woody A Lee, Jr.
*Assistant Examiner* — Jason A Fountain
(74) *Attorney, Agent, or Firm* — Carlson, Gaskey & Olds, P.C.

(57) ABSTRACT

A turbine exhaust case has an outer housing to be secured within a gas turbine engine and a central hub. Struts extend between the outer housing and the central hub. The struts are formed at least in part of a first material. The central hub is formed at least in part of a second material.

4 Claims, 3 Drawing Sheets

Related U.S. Application Data

(60) Provisional application No. 61/660,199, filed on Jun. 15, 2012, provisional application No. 61/808,849, filed on Apr. 5, 2013.

(51) Int. Cl.
  F01D 25/30 (2006.01)
  F01D 21/04 (2006.01)
  F02K 1/38 (2006.01)
  F01D 25/24 (2006.01)
  F02C 9/18 (2006.01)

(52) U.S. Cl.
  CPC .............. F01D 25/24 (2013.01); F01D 25/30 (2013.01); F02C 9/18 (2013.01); F02K 1/386 (2013.01); *F05D 2220/32* (2013.01); *F05D 2230/21* (2013.01); *F05D 2230/232* (2013.01); *F05D 2230/25* (2013.01); *F05D 2230/54* (2013.01); *F05D 2260/941* (2013.01); *F05D 2300/175* (2013.01); *F05D 2300/176* (2013.01); *F05D 2300/177* (2013.01); *F05D 2300/502* (2013.01)

(58) Field of Classification Search
  CPC ........ F01D 25/24; F01D 25/30; F01D 25/162; F01D 25/243
  See application file for complete search history.

(56) References Cited

U.S. PATENT DOCUMENTS

| | | | |
|---|---|---|---|
| 7,100,358 B2 | 9/2006 | Gekht | |
| 8,087,874 B2* | 1/2012 | Jardine | F01D 9/047 |
| | | | 415/189 |
| 8,292,570 B2* | 10/2012 | Suciu | F01D 5/026 |
| | | | 415/68 |
| 8,373,089 B2 | 2/2013 | Johnson et al. | |
| 8,776,533 B2* | 7/2014 | Feindel | F01D 25/162 |
| | | | 60/796 |
| 2009/0142182 A1 | 6/2009 | Kapustka | |
| 2010/0221115 A1 | 9/2010 | Jardine et al. | |
| 2011/0073745 A1* | 3/2011 | Duchatelle | F01D 9/04 |
| | | | 248/637 |
| 2011/0214433 A1 | 9/2011 | Feindel et al. | |
| 2011/0232291 A1 | 9/2011 | Luedke et al. | |

OTHER PUBLICATIONS

International Search Report from PCTUS2013/045765, completed Sep. 5, 2013.

Supplementary European Search Report for European Application No. 13804715.4 dated Jun. 28, 2016.

\* cited by examiner

HIGH DURABILITY TURBINE EXHAUST CASE

CROSS-REFERENCE TO RELATED APPLICATION

This application is a continuation of U.S. application Ser. No. 14/400,648, filed Nov. 12, 2014, which is the U.S. national stage of PCT/US2013/045765, filed Jun. 14, 2013, which claims priority to U.S. Provisional Application No. 61/660,199, filed Jun. 15, 2012, and U.S. Provisional Application No. 61/808,849, filed Apr. 5, 2013.

BACKGROUND

This application relates to a turbine exhaust case.

Gas turbine engines typically include a fan delivering air into a bypass duct as propulsion air. Air also passes into a core engine and to a compressor. The air in the compressor is compressed and delivered into a combustor where it is mixed with fuel and ignited. Products of this combustion pass downstream over turbine rotors, driving them to rotate.

Historically, a fan drive turbine drove the fan and a low pressure compressor at a single speed. More recently, a gear reduction has been placed between the fan drive turbine and the fan.

With this change, the fan may rotate at slower speeds than the fan drive turbine and the low pressure compressor. This allows the diameter of the fan to increase and has resulted in an increase in the amount of air delivered into the bypass duct compared to the air delivered into the core engine. A quantity known as the bypass ratio compares the volume of air delivered into the bypass duct to the volume of air delivered into the compressor. Bypass ratios have increased with modern gas turbine engine utilizing a fan drive gear reduction.

As the bypass ratio increases, there is less cooling air for cooling internal components, such as a turbine exhaust case.

SUMMARY

In a featured embodiment, a gas turbine engine has a core, and a turbine exhaust case downstream of and in fluid communication with the core. The turbine exhaust case has a central hub including a support surface, and an outer housing secured within the gas turbine engine. A turbine section has at least a turbine rotor, with the turbine rotor including a shaft supported at least, in part, by the support surface in the turbine exhaust case, and at least one rotating blade driven by the turbine rotor. The turbine exhaust case is constructed of at least a first material and a second material such that the turbine exhaust case captures the at least one blade should the blade become separated from the rotor during conditions in which greater than about 15% of the airflow through the core of the engine is continuously bled from the core.

In another embodiment according to the previous embodiment, the turbine exhaust case captures the at least one blade should the blade become separated from the rotor at temperatures of greater than about 1200° F.

In another embodiment according to any of the previous embodiments, an engine idle condition is the conditions in which greater than about 15% of the airflow through the core of the engine is continuously bled from the core.

In another embodiment according to any of the previous embodiments, a bypass ratio is defined by airflow through a bypass duct that circumscribes the core to the airflow through the core is greater than about 6.0.

In another embodiment according to any of the previous embodiments, the first material is Haynes 282.

In another embodiment according to any of the previous embodiments, the second material is Inconel.

In another embodiment according to any of the previous embodiments, the first material is Haynes 282.

In another featured embodiment, a gas turbine engine has a turbine exhaust case with a central hub including a support surface and an outer housing secured within the gas turbine engine. A turbine section has at least a turbine rotor, with the turbine rotor including a shaft supported at least, in part, by the support surface in the turbine exhaust case. at least one rotating blade is driven by the turbine rotor. The turbine exhaust case is constructed of at least a first material and a second material such that the turbine exhaust case captures the at least one blade should the blade become separated from the rotor at temperatures of greater than about 1200° F.

In another embodiment according to any of the previous embodiments, the turbine exhaust case captures the at least one blade should the blade become separated from the rotor during engine idle conditions.

In another embodiment according to any of the previous embodiments, the turbine exhaust case captures the at least one blade should the blade become separated from the rotor during conditions in which greater than about 15% of airflow through a core of the engine, which is upstream of the turbine exhaust case, is continuously bled from the core.

In another embodiment according to any of the previous embodiments, a bypass ratio is defined by airflow through a bypass duct that circumscribes the core to the airflow through the core is greater than about 6.0.

In another embodiment according to any of the previous embodiments, the first material is Haynes 282.

In another embodiment according to any of the previous embodiments, the second material is Inconel.

In another embodiment according to any of the previous embodiments, the first material is Haynes 282.

In another featured embodiment, a gas turbine engine has at least one fan blade driven to rotate on a fan rotor, a core, and a turbine exhaust case downstream of and in fluid communication with the core. The turbine exhaust case has a central hub including a support surface and an outer housing secured within the gas turbine engine. A turbine section includes at least a turbine rotor, with the turbine rotor including a shaft supported at least, in part, by the support surface in the turbine exhaust case. The turbine exhaust case is constructed of at least a first material and a second material such that the turbine exhaust case continues to support an aft end of the engine should the at least one blade become separated from the fan rotor during conditions in which greater than about 15% of the airflow through the core of the engine is continuously bled from the core.

In another embodiment according to any of the previous embodiments, the turbine exhaust case continues to support an aft end of the engine should the fan blade become separated from the fan rotor at temperatures of greater than about 1200° F.

In another embodiment according to any of the previous embodiments, an engine idle condition is the condition in which greater than about 15% of the airflow through the core of the engine is continuously bled from the core.

In another embodiment according to any of the previous embodiments, a bypass ratio is defined by airflow through a bypass duct that circumscribes the core to the airflow through the core is greater than about 6.0.

In another embodiment according to any of the previous embodiments, the first material is Haynes 282.

In another embodiment according to any of the previous embodiments, the second material is Inconel.

In another embodiment according to any of the previous embodiments, the first material is Haynes 282.

Features of this disclosure may be best understood from the following drawings and specification.

DETAILED DESCRIPTION

Figure 1:
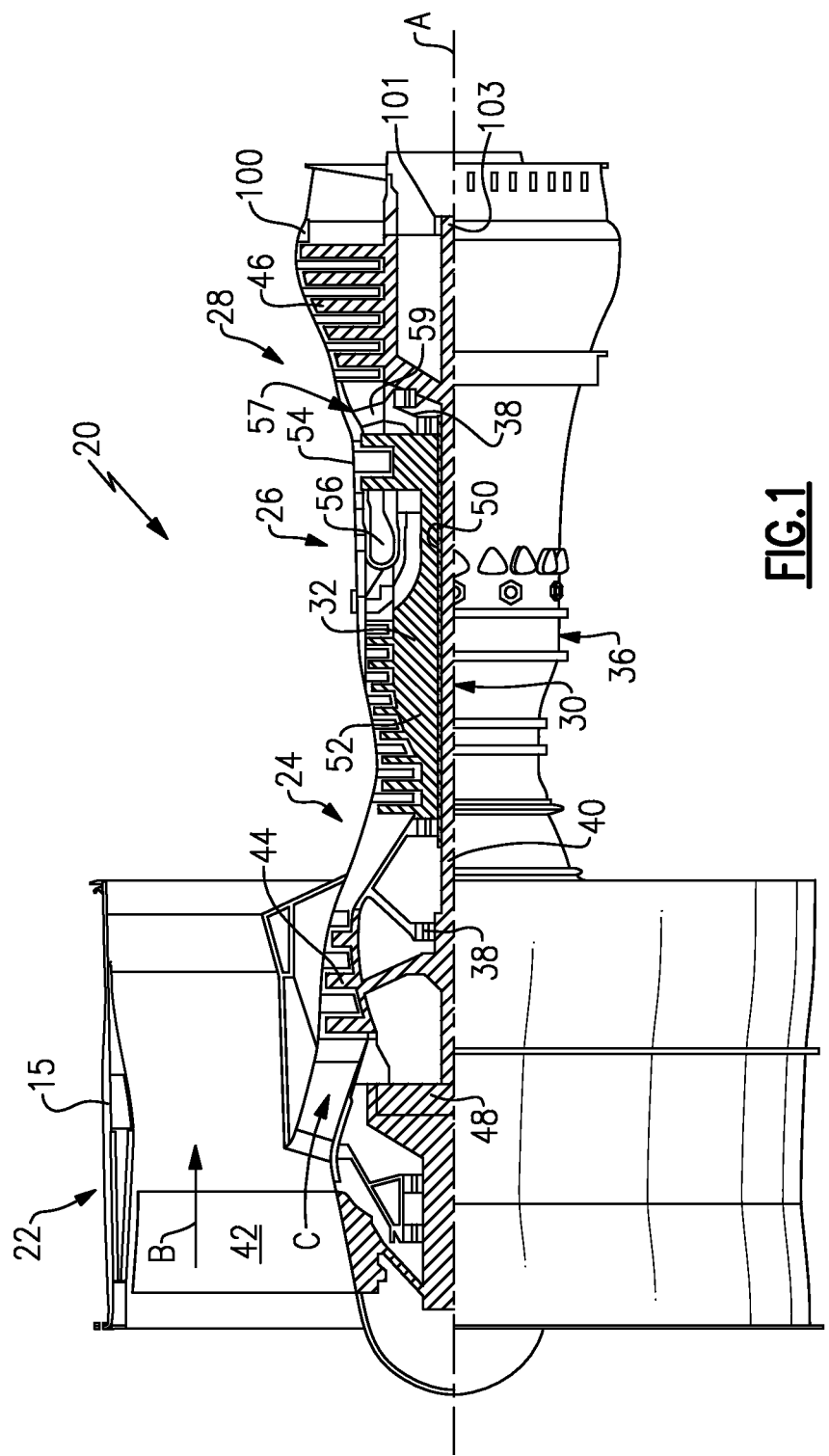
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath B in a bypass duct defined within a nacelle 15, while the compressor section 24 drives air along a core flowpath C for compression and communication into the combustor section 26 then expansion through the turbine section 28. Thereafter, exhaust gases pass through a turbine exhaust case 100. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46, and exhausted via the turbine exhaust case 100, which is downstream of the low pressure turbine 46. The mid-turbine frame 57 includes airfoils 59 which are in the core airflow path. The turbines 46, 54 rotationally drive the respective low speed spool 30 and high speed spool 32 in response to the expansion.

The engine 20 in one example is a high-bypass geared aircraft engine. In a further example, the engine 20 bypass ratio is greater than about six (6), with an example embodiment being greater than ten (10), the geared architecture 48 is an epicyclic gear train, such as a star or planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second.

To improve engine efficiency, all aspects of the engine cycle need to be addressed. Increasing thermal efficiency of the core of the engine allows more mechanical work to be produced for a given amount of fuel burned. An improvement in propulsive efficiency transfers the mechanical work by moving air predominantly using a large fan, as described above. The result of improving overall engine efficiency results in an increase in fan diameter and a reduction in the size of the core engine. The relative relationship may be expressed as the bypass ratio, which is the ratio of air flowing through the fan divided by the air passing through the core. Example bypass ratios are mentioned above. As the bypass ratio increases, the thermal efficiency of the core improves and the size of the core is dramatically reduced.

The demands of the aircraft for engine bleed air for cabin pressurization and wing air-ice application, among other applications, is determined by the requirements of the aircraft and these requirements are not reduced. The net effect is that the air bled off the engine core to satisfy aircraft requirements is a high percentage of total core airflow. For example, in some circumstances, e.g. a ground idle, the amount of air bled off the engine may exceed, for example, greater than or equal to about 15% of the total core airflow.

In other situations, the amount may exceed greater than or equal to above 20% of the total core airflow.

The geared turbofan engine 20 enables relatively high bypass flow ratios. The higher bypass flows in-turn results in reduced core flow (and available bleed flow air) available for aircraft services and engine component cooling at ground idle operating conditions. Therefore under worst case ambient conditions and ground idle aircraft waiting periods, a turbine exhaust case 100 of the engine 20 may experience higher temperatures than ever experienced in modern gas turbine engines. These higher temperatures could result in reduced turbine exhaust case durability.

It is expected that a turbine exhaust case 100 may not be provided with cooling air, as core air flow is at such a premium. The turbine exhaust case 100 must thus survive a gas path environment that may be higher than 1200° F. for long periods of time. The turbine exhaust case 100 must provide resistance to creep and fatigue during this exposure. In addition, the turbine exhaust case must operate on a sustained basis at core bleed levels of greater than about 15% and at low flow conditions (e.g., ground idle). Also, the turbine exhaust case must exist at those low flow conditions and excess temperature conditions in a high bypass ratio engine. Further, the turbine exhaust case must provide full containment and engine aft mount structure/stability in the event of both: (a) a low pressure turbine blade release event, and (b) a fan blade release event (i.e., a fan blade-out event).

As shown schematically, the turbine exhaust case 100 mounts a bearing 101 that mounts an aft end 103 of the shaft 40. Details of the bearing 101 and its mount will be disclosed below.

Figure 2:
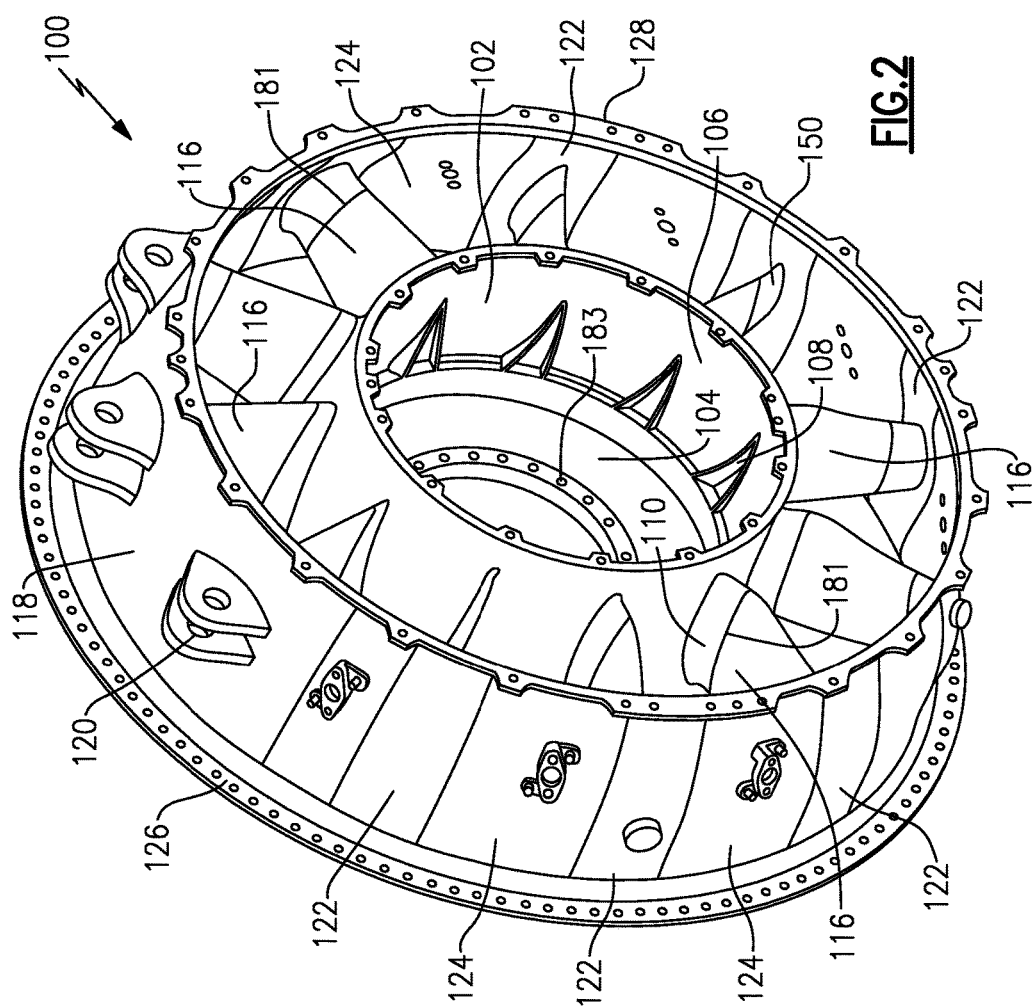
FIG. 2 shows a turbine exhaust case to be incorporated into a gas turbine engine, such as the FIG. 1 gas turbine engine.

FIG. 2 shows details of a turbine exhaust case 100 designed to withstand the conditions mentioned above. The turbine exhaust case 100 is formed of at least two distinct materials. A first material is selected for its ability to maintain its properties under high temperature conditions. The first material may be an alloy that provides resistance to long-term exposure to temperatures in excess of 1200° F., and provides resistance to creep and fatigue. The material may not necessarily be as strong as a second material, to be described below. However, the first material is selected to be more temperature resistant and to maintain its properties at high temperatures. One such material for the first material may be Haynes 282, as an example.

The second material is selected since it is easily cast, stronger, and also less expensive than the first material. It may well be the second material is less resistant to temperature changes. The second material may provide a capability to optimize dynamic strength and cost. One such material for the second material may be Inconel 718 ("Inconel").

The turbine exhaust case 100 utilizes the relatively expensive first material at areas more prone to seeing high temperatures, and the second material at other locations.

An inner or central hub 102 includes an inner conical ring 104 spaced from an outer cylindrical ring 106 by a plurality of ribs 108. The inner ring 104 provides a bearing flange to support a shaft, such as the shaft of the turbine rotors. As can be seen, the outer ring 106 has a plurality of stubs 110 extending radially outwardly. Hub 102 is formed from the second material mentioned above. Hub 102 may be cast, forged or wrought.

Struts 116 each include an airfoil secured, such as by an appropriate welding technique, to a stub 110. The struts 116 extend radially outwardly and are secured into an outer periphery of the turbine exhaust case 100 at strut plate 122. The plates 122 are formed of a forging of the first material. The struts 116 may be formed of a sheet metal of the first material. A shroud mount 118 includes a plurality of mount holes 120, which will secure the turbine exhaust case 100 within the overall engine housing. The shroud mount 118 is also formed of the forged first material.

As can be seen, the plates 122, which are secured to the struts 116, include a stub 150 extending radially inwardly. In a sense, the stubs 150 and 110 are secured to strut 115 to form the overall airfoil to mitigate aerodynamic losses.

The flange 126 and forward sections of plates 122 and 124 and the shroud mount 118 provide containment in the event of a turbine blade release event. The central hub 102 mounts the turbine rotors, and thus maintains a rotor centerline during a fan blade-out event.

Intermediate plates 124 are positioned circumferentially intermediate the plates 122. These plates may be formed of the second material.

A weld joint 181 is provided between each stub 150/110, and the struts 116. The weld joints are selected to be at a location that will be relatively cool and low stress during operation of the associated gas turbine engine. Thus, the weld joints between the dissimilar materials are optimized to minimize thermal exposure and stress during operation of the engine, including low power conditions (e.g., idle).

The thickness of the flange 126, struts 116 and the plates 122/124/118 are adequate to contain the release of a turbine blade at rotational speeds up to 11,000 rpm.

Figure 3A:
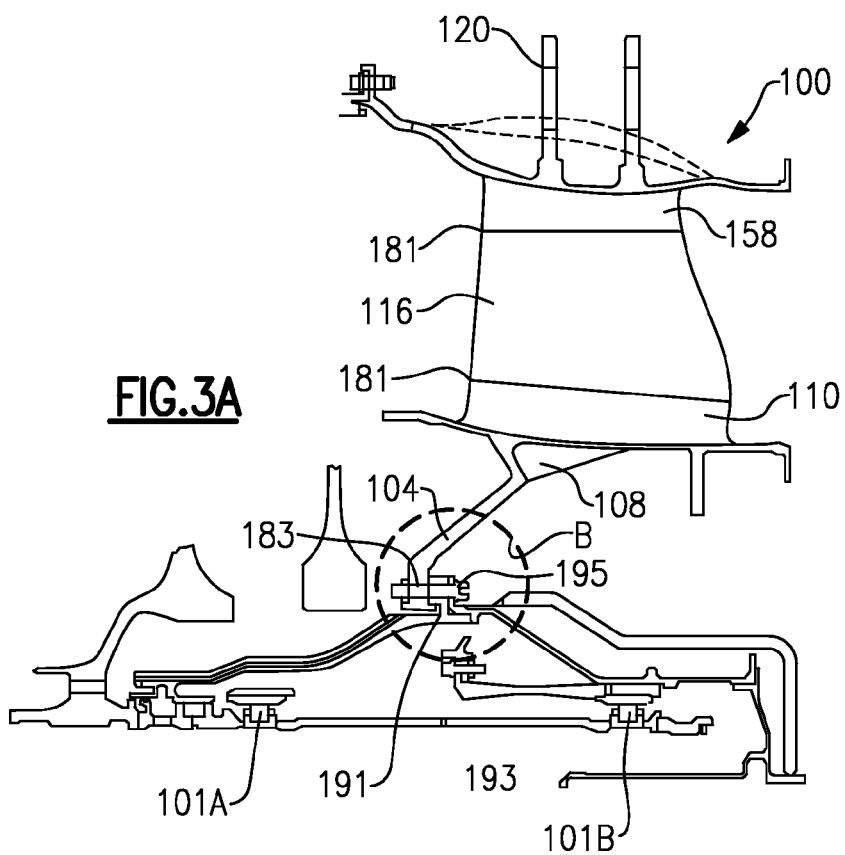
FIG. 3A shows a cross-section through the turbine exhaust case and associated structure.

FIG. 3A is a cross-section through the turbine exhaust case 100, and shows details of a bearing mount for mounting bearings 101A and 101B to support the aft end of the low pressure turbine shaft. As shown in FIG. 3A, the inner conical ring 104 has a remote end that receives a bolt 195 to attach to bearing support flanges 191 and 193.

Figure 3B:
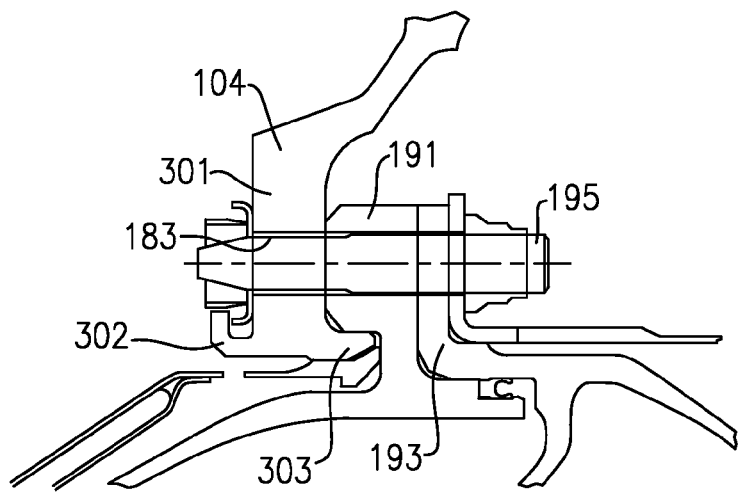
FIG. 3B is a detail of the area within area B of FIG. 3A.

As shown in FIG. 3B, a flange 301 is defined at the radially inner end of the inner conical ring 104. Ears 302 and 303 extend in opposed axial directions from the flange 301. Holes 183 are formed through the flange 301 and receive the pin 195. Bearing support flanges 191 and 193 extend as shown in FIG. 3A to the bearings 101A and 101B. Bearing 101A and 101B are the detail of the FIG. 1 schematic bearing 101.

The stiffness of the mount is adequate to maintain the dynamic stability of the rotating components of the engine throughout the expected operational range of speeds, pressures and temperatures. The bearings 101A and 101B stabilize a relatively high speed low pressure turbine for rotor dynamic stability also throughout that operating range of speeds, pressures and temperatures.

The positioning of the flanges 191 and 193 aft of the flange 301 facilitates disassembly and bearing replacement without the requirement of removing the turbine exhaust case 100. Further, the flange configuration enables disassembly and bearing replacement while the engine remains on an the wing of an airframe, i.e., the flange configuration enables bearing replacement without the need to transport the engine to a special, remote maintenance, repair, and/or overhaul facility.

The inventive turbine exhaust case 100, thus, combines components formed of both the first and second material, wherein the first material is selected to have better resistance to high temperatures and to maintain its properties at high temperatures. Utilizing this material at the locations which are most likely to see higher temperatures makes a turbine exhaust case that is better able to survive high temperatures.

On the other hand, the second material is utilized, in particular, at locations which are to be cast, and at locations which may not see as high of temperatures. Thus, the second material, which may be less expensive than the first material, may be utilized in those locations. The second material may also be more easily cast than the first material and is also stronger.

A forward 126 and rear 128 flange may be welded to the several plates 122, 124 and may be formed of the second material. Ring forgings may be utilized to form the flanges 126 and 128.

Although particular materials are disclosed for both the first and second material, a worker of ordinary skill in this art would recognize other materials that would be appropriate and would meet the qualifications and properties as mentioned above.

As other examples, other materials may be used instead of, or in addition to, Haynes 282 and Inconel. Alternative materials families such as Waspalloy, Inconel 939, and cast Haynes 282 may be used. These alternative materials could be used with tradeoffs in either durability or cost or both durability and cost.

The materials selected provide for low fuel consumption engine performance and durability at reduced cost. Other material options are available to also provide suitable performance.

The welding arrangements that are utilized are intended to ensure that even with the failure of one of the mounts, the turbine exhaust case will continue to maintain proper mounting structure of the engine and centering of the low pressure turbine shaft. Further, the welding operations are selected to ensure the quality of the welds may be easily inspected and will be relatively long-lived. More specifically, the weld locations are such that the welds may be inspected by fluorescent penetrant inspection after removal and disassembly during, for example, major engine overhauls.

Features of this disclosure include a high durability turbine exhaust case that enables unprecedented engine cycle performance and durability for modern aerospace gas turbine engines.

As a result of the structural stability and strength afforded by the second material and the temperature performance afforded by the first material, the turbine exhaust case 100 satisfies the demands of the aircraft for engine bleed air for cabin pressurization and wing air-ice application (among other applications) under ground idle conditions in which the amount of air bled off the engine may exceed, for example, greater than or equal to about 15% of the total core airflow. Further, the turbine exhaust case using the first and second materials maintains its structural stability and strength when temperatures in the turbine exhaust case 100 exceed 1200° F. during such ground idle operating conditions.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A gas turbine engine comprising:
    a fan delivering air into a core engine, and into a bypass duct as bypass air, said core engine including a compressor fluidly connected to a combustor, said combustor fluidly connected to a turbine section, with a turbine exhaust case downstream of said turbine section, said turbine exhaust case including:
        a central hub including a support surface; and
        an outer housing secured within the gas turbine engine;
        said turbine section including at least one turbine rotor, with the turbine rotor including a shaft supported at least, in part, by the support surface in the turbine exhaust case;
    wherein the turbine exhaust case is constructed of at least a first material and a second material; and
    said central hub having a plurality of radially outwardly extending stubs and struts extending between the outer housing and said central hub, and said plurality of radially outwardly extending stubs being welded to said struts, such that radially inner portions of an airfoil are formed by the stubs of the second material, and radially outward portions of said airfoil are formed by the struts of the first material.

2. The gas turbine engine of claim 1, wherein said stub being formed as an integral part of said central hub by being cast, forged or wrought.

3. A gas turbine engine comprising:
    a fan delivering air into a core engine, and into a bypass duct as bypass air, said core engine including a compressor fluidly connected to a combustor, said combustor fluidly connected to a turbine section, with a turbine exhaust case downstream of said turbine section;
    the turbine exhaust case downstream of and in fluid communication with the core engine, the turbine exhaust case having:
        a central hub including a support surface; and
        an outer housing secured within the gas turbine engine;
        a turbine section including at least a turbine rotor, with the turbine rotor including a shaft supported at least, in part, by the support surface in the turbine exhaust case;
    wherein the turbine exhaust case is constructed of at least a first material and a second; material; and
    said central hub having a plurality of radially outwardly extending stubs and struts extending between the outer housing and said central hub, and said plurality of radially outwardly extending stubs being welded to said struts, such that radially inner portions of an airfoil are formed by the stubs of the second material, and radially outward portions are formed by the struts of the first material.

4. The gas turbine engine of claim 3, wherein said stub being formed as an integral part of said central hub by being cast, forged or wrought.

* * * * *